Sept. 24, 1968     G. DE COYE DE CASTELET     3,402,940

REAR WHEELS SUSPENSION SYSTEMS FOR MOTOR VEHICLES

Filed March 7, 1966

United States Patent Office 3,402,940
Patented Sept. 24, 1968

3,402,940
REAR WHEELS SUSPENSION SYSTEMS FOR MOTOR VEHICLES
Gaëtan de Coye de Castelet, Billancourt, France, assignor to Regie Nationale des Usines Renault, Billancourt, France
Filed Mar. 7, 1966, Ser. No. 532,227
Claims priority, application France, Mar. 22, 1965, 10,211
5 Claims. (Cl. 280—124)

ABSTRACT OF THE DISCLOSURE

A rear wheel suspension system for motor vehicles comprising two independent longitudinal wheel suspension arms adapted to oscillate about pivots arranged transversely to the vehicle and carried by a cross-member elastically connected to the vehicle chassis. The elastic connection between the cross-member and chassis is effected in the vicinity of the wheels by means of elastic pads mounted to work in shear in vertical planes parallel to the longitudinal axis of the vehicle. Each wheel suspension arm is connected, by means of a substantially vertically orientated link, to a longitudinal lever articulated on the chassis and cooperating with an elastic suspension member adapted to accept the load of the corresponding wheel.

---

The invention relates to a rear wheel suspension system for motor vehicles whereby it is possible more particularly to reduce the transmission to the vehicle chassis of vibrations caused by the running of the tires, whilst ensuring that the wheels are held in a satisfactory manner as regards the road holding behavior of the vehicle.

It relates more particularly to a suspension system of the longitudinal arm and drawn wheel type, according to which the aforesaid desired conditions are essentially obtained by separating the two functions which a rear wheel suspension system has to satisfy;

On the one hand, two provide suspension and damping for the vehicle; and

On the other hand to ensure that the wheels are held in their plane.

Essentially, the rear wheel suspension system according to the invention, comprising two independent longitudinal wheel suspension arms adapted to oscillate about pivots arranged transversely with respect to the vehicle and carried by a cross-member connected elastically to the chassis, is characterized in that the elastic connection between the cross-member and the chassis is provided in the vicinity of the wheels by means of elastic pads arranged to work in shear in vertical planes parallel to the longitudinal axis of the vehicle, and that each suspension arm is connected, by means of a link the orientation of which is substantially vertical, to a longitudinal lever articulated to the chassis and co-operating with an elastic suspension member intended to accept the load of the corresponding wheel.

One form of embodiment of such a rear wheel suspension system is described hereinafter by way of example with reference to the accompanying drawings wherein.

Figure 1:
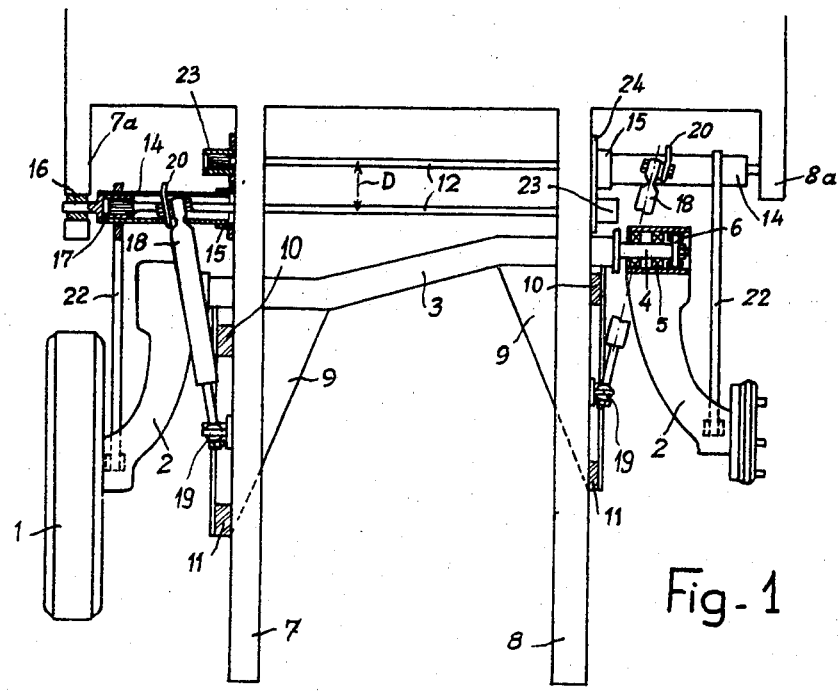
FIGURE 1 is a diagrammatic plan view of the said rear wheel suspension system, wherein the said elastic pads are marked with double hatching in order to make them stand out more clearly.
Figure 2:
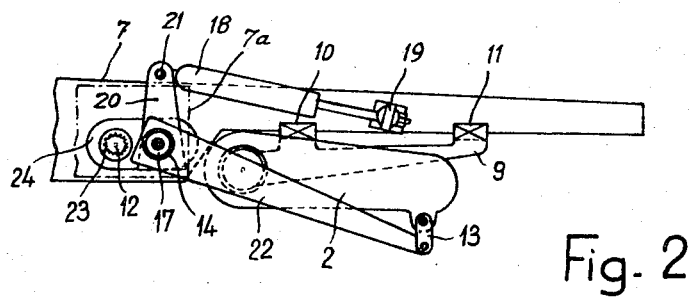
FIGURE 2 is a side view of a portion of this system.

The wheels 1 are mounted on arms 2 which are pivotably connected to a common crossmember 3.

Each arm 2 is pivotably mounted by means of a pivot 4 fast with the cross-member 3 through the agency of a ring or rolling contact bearings, such as needle bearings 5.

The transverse forces which are produced when the vehicle is turned are absorbed by a thrust bearing 6 (for example a double thrust bearing on the needle type).

The assembly constituted by the arms and the cross-member is connected to the side members 7 and 8 of the vehicle chassis, which is only partially represented, through the agency of sheet metal supports 9 fast with the cross-member 3 and connected laterally to these side members by pads of an elastomeric material preferably two in number, 10 and 11, associated with each wheel, and working in shear in a vertical plane parallel to the longitudinal axis of the vehicle.

The arrangement of the elastic pads is such that the plane of each wheel thus remains substantially parallel to the longitudinal axis of the vehicle when the latter is subjected to transverse forces. On the other hand, the longitudinal and vertical flexibility of these pads ensures a considerable freedom of movement in the vertical plane for the assembly thus constituted. These pads 10 and 11 are preferably respectively arranged forwardly and rearwardly of the axis of each of the wheels.

The vertical suspension forces applied to each wheel are here transmitted to a torsion bar 12, arranged transversely to the side members of the chassis, through the agency of a link 13 which is connected on the one hand to the arm 2 and on the other to a lever 22 effecting the torsional entrainment of the suspension bar. The connection between lever 22 and bar 12 is effected by means of an articulation hub 14 which is connected to the chassis by means of two bearings 15 and 16, and comprising an anchoring end piece 17 for the bar 12. The bearing 15 are supported by the side members 7, 8 and the bearings 16 by auxiliary side members 7a, 8a.

Each torsion bar 12 is anchored at its other end in a sleeve 23 fast with a fixing support 24 common to the said sleeve and to the bearing 15 of the other torsion bar, this support being fitted on the side of the corresponding side members 7 or 8.

In view of this use of transverse torsion bars of considerable length, the said bars are here offset in the horizontal plane by the interval D, which again occurs, without any disadvantage, between the axes of the rear wheels in question.

Yet it will be apparent that the use of torsion bars is not limitative within the framework of the present invention, but that each lever 22 may be arranged to co-operate with any other known elastic element operating as a suspension spring means.

However, this lever 22 is preferably given a slight thickness and arranged to be capable of elastic deformation in the transverse sense relatively to the vehicle.

Also, owing to the link 13, this suspension system provides great freedom for the wheel from front to rear, when the said wheel is subjected to impacts due to rolling over an obstacle.

For each wheel a telescopic shock absorber 18 is provided between the chassis, to which it is articulated at a point 19, and an arm 20 fast with the hub 14 of the lever 22, to which arm the shock absorber is articulated at 21. This shock absorber mounting makes it possible to damp the vertical displacements of the wheel without bringing any parasitic elasticity into play.

This wheel suspension system makes it possible to avoid the vehicle becoming subjected to vibrations of the wheel set caused by irregularities of the road surface, owing to the possibilities of longitudinal and vertical displacement for the wheels and the suspension arm resulting from the use of the links 13 and the elasticity of the pads 10 and 11.

Of course, many possible modifications may be made within the framework of the invention.

I claim:

1. A rear wheel suspension system for motor vehicles comprising an independent longitudinal wheel suspension arm for each wheel, cross-member means for each pair of wheels and which is mounted transversely to the vehicle chassis, said arms being mounted on one end to said cross-member means and carrying said wheels on the other end, elastic connection means positioned between and mounting said cross-member means on said chassis in the vicinity of said wheels, said elastic connection means comprising elastic pads mounted to work in shear in vertical planes parallel to the longitudinal axis of the vehicle, longitudinally extending lever means for each wheel articulated on one end to said chassis, substantially vertically positioned link means opeartively connecting the other end of said lever means to said arm whereby said lever means and said elastic connection means receive the load of the corresponding wheel.

2. A rear wheel suspension system according to claim 1, in which the elastic pads are at least two in number and are spaced longitudinally in relation to the vehicle.

3. A rear wheel suspension system according to claim 2, in which the elastic pads are situated forwardly and rearwardly with respect to the axis of the respective wheel.

4. A rear wheel suspension system according to claim 1, in which each longitudinal lever is capable of elastic deformation in the transverse sense relatively to the vehicle.

5. A rear wheel suspension system according to claim 1, in which each wheel suspension further comprises at least one shock absorber arranged between a point on the chasis and a point on an arm fast with the aforesaid longitudinal lever.

References Cited

UNITED STATES PATENTS

| 3,201,142 | 8/1965 | Dangauthier | 280—124.1 |
| 2,270,571 | 1/1942 | Woolson | 280—124.3 |

FOREIGN PATENTS

| 20,968 | 8/1956 | Germany. | |

PHILIP GOODMAN, *Primary Examiner.*